United States Patent
O'Brien-Strain et al.

(10) Patent No.: US 8,593,478 B2
(45) Date of Patent: Nov. 26, 2013

(54) EXTRACTION OF A COLOR PALETTE MODEL FROM AN IMAGE OF A DOCUMENT

(75) Inventors: Eamonn O'Brien-Strain, San Francisco, CA (US); Clayton Brian Atkins, Mountain View, CA (US); Niranjan Damera-Venkata, Mountain View, CA (US); Jerry J Liu, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 566 days.

(21) Appl. No.: 12/907,936

(22) Filed: Oct. 19, 2010

(65) Prior Publication Data

US 2012/0092359 A1     Apr. 19, 2012

(51) Int. Cl.
| | | |
|---|---|---|
| G09G 5/00 | (2006.01) | |
| G09G 5/02 | (2006.01) | |
| H04N 5/445 | (2011.01) | |
| H04N 1/46 | (2006.01) | |
| G03F 3/08 | (2006.01) | |
| G06K 9/00 | (2006.01) | |
| G06K 9/40 | (2006.01) | |
| G06K 9/46 | (2006.01) | |
| G06K 9/36 | (2006.01) | |
| G06F 17/00 | (2006.01) | |

(52) U.S. Cl.
USPC ........... 345/589; 345/606; 348/552; 348/557; 358/515; 358/518; 358/525; 358/448; 382/165; 382/167; 382/190; 382/260; 382/276; 715/200; 715/272; 715/275

(58) Field of Classification Search
USPC ......... 345/418, 589–594, 581, 600–601, 606, 345/618–619, 660, 670, 530, 549, 501; 348/253–354, 552, 557, 560, 571, 586; 358/512, 515, 518, 525, 448; 382/162–163, 165–167, 170, 190, 382/224–225, 254, 260, 274, 276, 281, 382/298–300; 715/200, 273, 275, 252–254, 715/256
See application file for complete search history.

(56) References Cited

U.S. PATENT DOCUMENTS

| | | | |
|---|---|---|---|
| 7,023,577 | B2 | 4/2006 | Watanabe et al. |
| 7,126,612 | B2 | 10/2006 | Sekiguchi et al. |

(Continued)

FOREIGN PATENT DOCUMENTS

| | | |
|---|---|---|
| JP | 2002218500 | 8/2002 |
| KR | 20050017708 | 2/2005 |

OTHER PUBLICATIONS

SCALA; Amazing Color Scheme and Palette Generators, http://www.zepy.net/archives/amazing-color-scheme-and-palette-generators.html.

(Continued)

*Primary Examiner* — Wesner Sajous

(57) ABSTRACT

A system and method are provided for determining a color palette model from an image of a document. Pixel values of the image of the document are clustered to provide image clusters. Color layers of the image are determined, each color layer corresponding to an image cluster. Aspects of the color palette model can be determined using the color layers. Aspects of the color palette model include a foreground-background color pair for a content block in the document and a background-area color of the document.

19 Claims, 8 Drawing Sheets

(56) References Cited

U.S. PATENT DOCUMENTS

| | | | |
|---|---|---|---|
| 2002/0051145 A1* | 5/2002 | Watanabe et al. | 358/1.9 |
| 2002/0159632 A1* | 10/2002 | Chui et al. | 382/168 |
| 2003/0063814 A1* | 4/2003 | Herley | 382/255 |
| 2009/0041345 A1 | 2/2009 | Tirumalareddy et al. | |
| 2009/0110270 A1* | 4/2009 | Poor | 382/165 |
| 2009/0281925 A1 | 11/2009 | Winter et al. | |
| 2012/0075329 A1* | 3/2012 | Skaff et al. | 345/593 |

OTHER PUBLICATIONS

AKEY; Extracting a clean palette from an image using photoshop; ArtRage Forums, http://www2.ambientdesign.com/forums/showthread.php?t=1565.

Big Huge Labs, Color Palette Generator, http://bighugelabs.com/colors.php.

Bitemap Data Colour Palette; http://blog.soulwire.co.uk/flash/actionscript-3/colourutils-bitmapdata-extract-colour-palette/.

Colr.og, http://www.colr.org/.

DeGraeve.com; Color Paletter Generator, http://www.degraeve.com/color-palette/.

G Peters; Instant Color Schemes, http://www.gpeters.com/color/color-schemes.php.

What is Color; http://whatsitscolor.com/.

\* cited by examiner

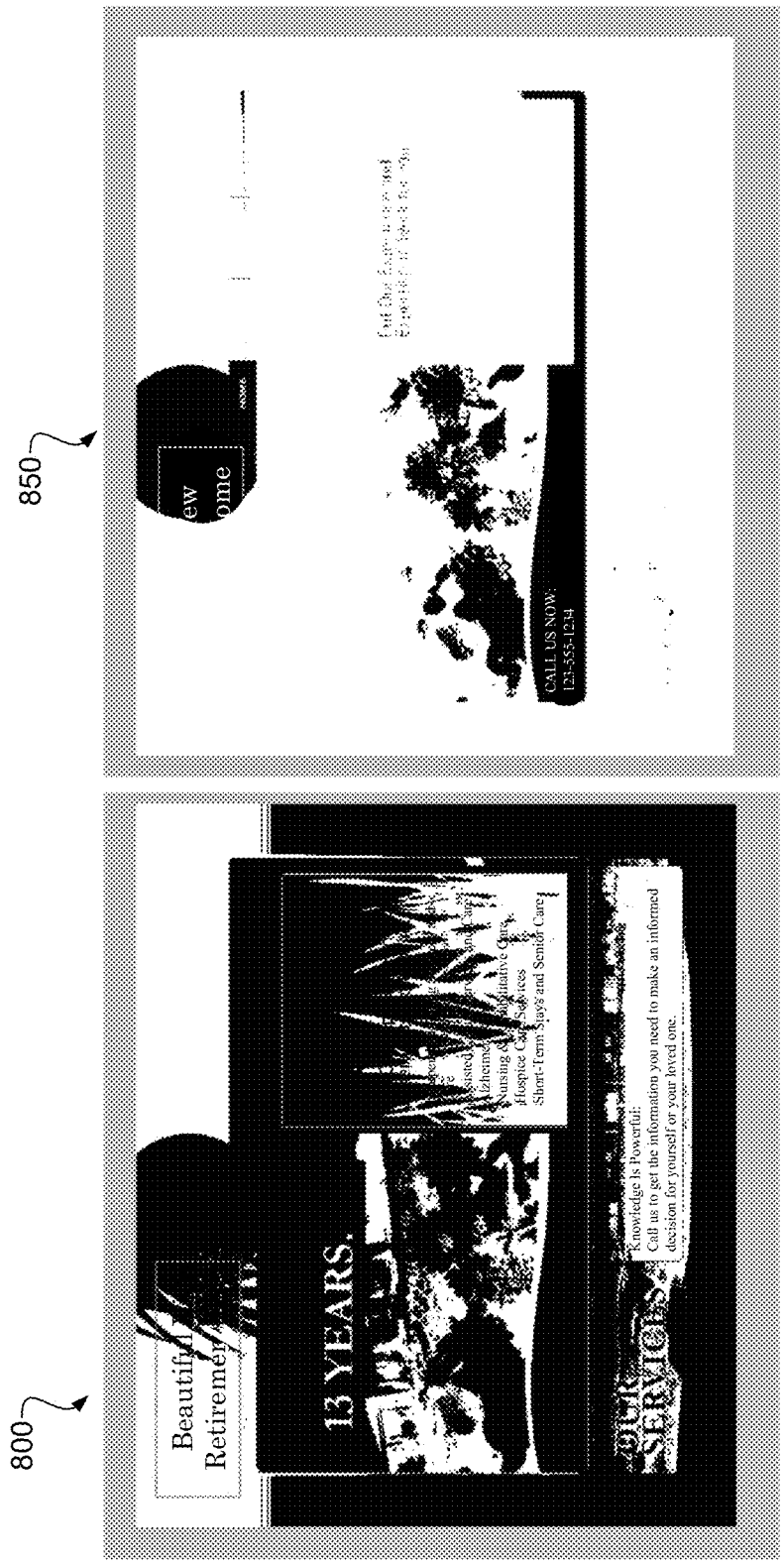

US 8,593,478 B2

EXTRACTION OF A COLOR PALETTE MODEL FROM AN IMAGE OF A DOCUMENT

BACKGROUND

The electronic format of a document may provide a way of specifying color values applied to various elements in the document. For example, an HTML file, and its associated CSS and JavaScript files, may specify explicit color values. However, in general, without having access to the rendering engine for a document format, the proportion of the colors appearing in a rendered document may not be ascertainable. A system and a method for extracting a color palette model from a document would be beneficial. For example, the system and method could be beneficial to a consumer or business that wishes to ascertain color palette model from a document.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 8A illustrates the image of FIG. 5 rendered using one of the determined color layers, according to one example of principles described herein.

FIG. 8B illustrates the image of FIG. 5 rendered using the inverse of one of the determined color layers, according to one example of principles described herein.

Throughout the drawings, identical reference numbers designate similar, but not necessarily identical, elements.

DETAILED DESCRIPTION

Figure 1:
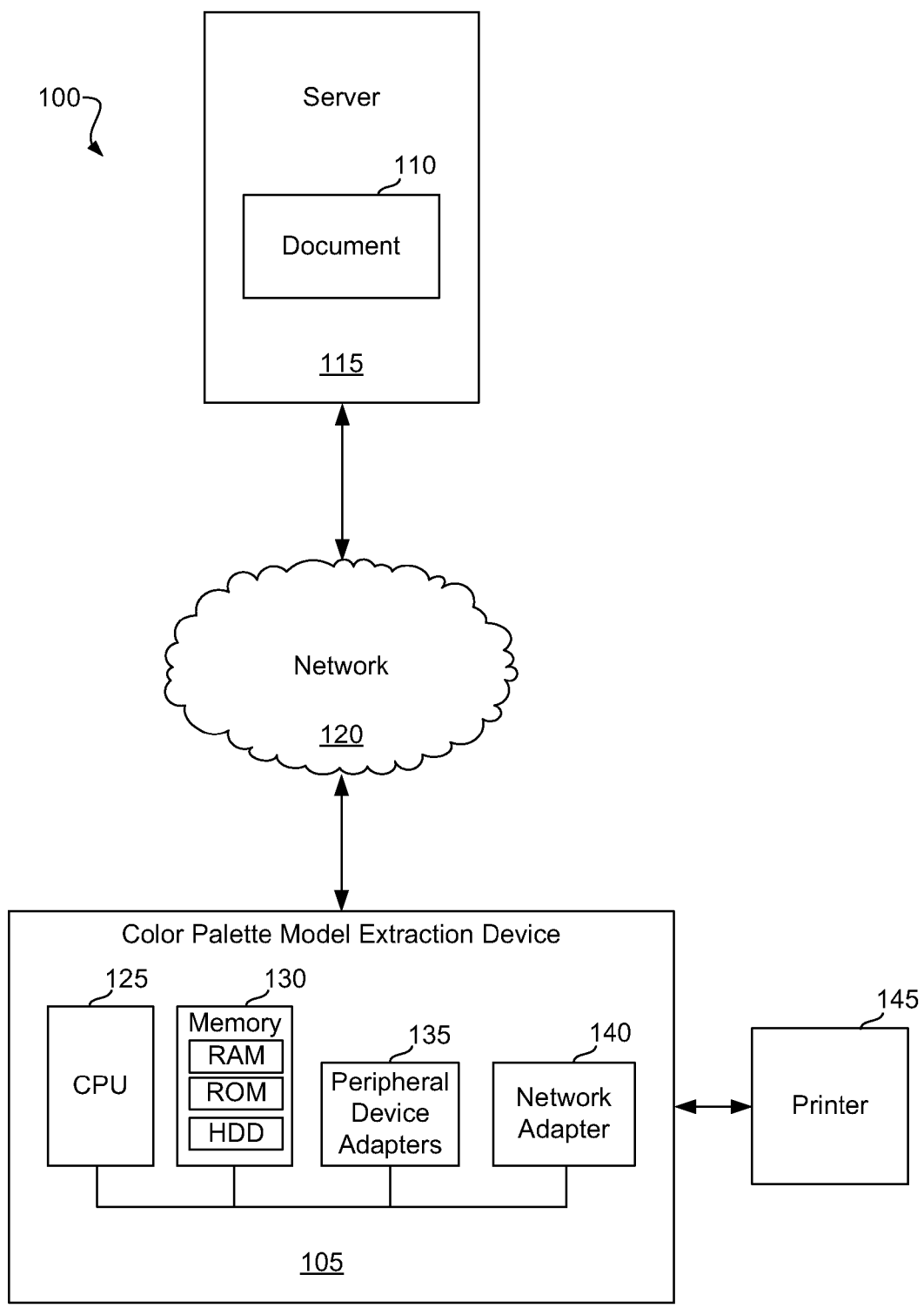
FIG. 1 is a block diagram of an illustrative system that can be used for extracting a color palette model from an image of a document according to one example of principles described herein.

In most final forms of a document, the color palette is no longer explicitly available and the original discrete distribution of colors may have been "smeared out" because of the presence of photographs, transparency used in layering, and anti-aliasing used to remove "jaggies" (stair-like, jagged lines that appear in an image where there should be smooth straight lines or curves). The present specification discloses various methods, systems, and devices that can be used for extracting a color palette model from a document. A non-limiting example of a color palette model is a set of colors and accompanying metadata that describes how the set of colors applies to content in a document and how the set of colors are grouped into foreground-background pairs. Other non-limiting examples of aspects of a color palette model are one or more of a set of color values, a set of pairs of colors for text foreground and text background of a text block, a set of pairs of colors for graphics foreground and graphics background for a graphics object (such as but not limited to a line), and a subset of colors that can be used for area-filling background.

In an example, a system and a method are provided for extracting the color palette model from images of a document. Non-limiting examples of a document include portions of a web page, a brochure, a pamphlet, a magazine, and an illustrated book. The systems and methods disclosed herein can be used to extract a color palette model from a document, for example but not limited to, for enabling the reuse of color palette information of the document to generate other documents. The image can be stored as a bitmap.

A system and method are provided that can be used to analyze the images of a document, such as a set of web pages or the page scans of a physical document. The system and method can be used to determine the color palette model from which the original designer chose colors for different uses in the document. Using image segmentation, pixel value clustering, and other image processing algorithms, the system and method can extract the most frequently occurring colors in the document, determine the types of content using them, and group the extracted colors in foreground-background color pairs.

In an example, a system and method are provided that can be used to determine the two most prevalent hues in a photograph. The system and method use a k-means clustering of pixel hue values, with an optimization of k-means that takes advantage of the single dimensionality of the analysis.

In one example, a system and method are provided for determining a color palette model from an image of a document. Pixel values of an image of a document are clustered to provide image clusters, and each pixel of an image cluster is assigned a central pixel value of the pixels of the image cluster to provide a quantized image cluster. Color layers of the document are determined, with each color layer corresponding to a quantized image cluster. For a content block detected in a first color layer of the document, a second color layer of the document is determined for which a coincident content block is detected in its inverse color layer. The color of the first color layer and the color of the second color layer are determined as a foreground-background color pair for the content block in the color palette model of the document.

In another example, a system and method are provided for determining a color palette model from an image of a document. Pixel values of an image of a document are clustered to provide image clusters and each pixel of an image cluster are assigned a central pixel value of the pixels of the image cluster to provide a quantized image cluster. Color layers of the document are determined, with each color layer corresponding to a quantized image cluster. An erode filter is applied to a given color layer of the document a predetermined number of times to provide a corresponding eroded color layer. The predetermined number of times can be a preset number, or can be adaptively determined using an adaptive algorithm. If the number of pixels of the corresponding eroded color layer is above the predetermined threshold value, the color of the given color layer is determined as a background-area color in the color palette model of the document. The predetermined threshold value can be set by a user or adaptively determined.

Provided herein are a system and method that aid a user, for example but not limited to a graphic designer, to determine what color palette model to use for a document. This may be a particular choice for an individual document, or it may be in adherence to an organization's branding guidelines. The choice of the palette model is a decision that can influence how a viewer experiences the document, including the subconscious impression it makes on them. A user may use the color palette model determined as described herein to decide, as non-limiting examples, what colors to use as background and foreground of text and graphics, what colors to use for general background areas, and to guide the selection of what photographs to use.

The color palette model determined as described herein can be used as part of a content repurposing system that can take the color palette model extracted from an existing document and apply that extracted color palette model to a different document that has different content. As compared to other palette-extraction methods, a\the systems and methods described herein extract a much richer set of color palette information, in that it determines how a document uses different color combinations for different purposes. This extra information is beneficial for re-using the color palette model when applying it to different content to create a new document.

As used in the present specification and in the appended claims, the term "web page" refers to a document that can be retrieved from a server over a network connection and viewed in a web browser application.

A "computing device" or "computer" is any machine, device, or apparatus that processes data according to computer-readable instructions that are stored on a computer-readable medium either temporarily or permanently. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any medium capable storing information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one example, but not necessarily in other examples. The various instances of the phrase "in one embodiment," "in one example," or similar phrases in various places in the specification are not necessarily all referring to the same embodiment.

The principles disclosed herein will now be discussed with respect to illustrative systems, devices, and methods for extracting a color palette model from a document.

Referring now to FIG. 1, an illustrative system (100) for extracting a color palette model from an image of a document includes a color palette model extraction device (105) that has access to a document (110) stored by a server (115). In an example where the document is a web page, document (110) is a web page stored by a server (115) that is a web page server. In one example, the document (110) is stored as an image. In another example, the document (110) is stored in a different document format and is converted to an image prior to application of a method described herein. In the example of FIG. 1, for the purposes of simplicity in illustration, the color palette model extraction device (105) and the server (115) are separate computing devices communicatively coupled to each other through a mutual connection to a network (120). However, the principles set forth in the herein extend equally to any alternative configuration in which a color palette model extraction device (105) has complete access to a document (110). As such, alternative examples within the scope of the principles of the present specification include, but are not limited to, examples in which the color palette model extraction device (105) and the server (115) are implemented by the same computing device, examples in which the functionality of the color palette model extraction device (105) is implemented by a multiple interconnected computers (e.g., a server in a data center and a user's client machine), examples in which the color palette model extraction device (105) and the server (115) communicate directly through a bus without intermediary network devices, and examples in which the color palette model extraction device (105) has a stored local copy of the document (110) from which the color palette model is to be extracted.

The color palette model extraction device (105) of the present example is a computing device configured to retrieve the document (110) hosted by the server (115). In the present example, this is accomplished by the color palette model extraction device (105) requesting the document (110) from the server (115) over the network (120) using the appropriate network protocol (e.g., Internet Protocol ("IP")). Illustrative processes of extracting the color palette model from an image of a document will be set forth in more detail below.

To achieve its desired functionality, the color palette model extraction device (105) includes various hardware components. Among these hardware components may be at least one processing unit (125), at least one memory unit (130), peripheral device adapters (135), and a network adapter (140). These hardware components may be interconnected through the use of one or more busses and/or network connections.

The processing unit (125) may include the hardware architecture necessary to retrieve executable code from the memory unit (130) and execute the executable code. The executable code may, when executed by the processing unit (125), cause the processing unit (125) to implement at least the functionality of retrieving the document (110), determining the affinity-grouped segments of the document (110), classifying affinity-grouped segments according to document function, and assembling the classified affinity-grouped segments according to the classified functions to provide an extracted article, according to the methods described below. In the course of executing code, the processing unit (125) may receive input from and provide output to one or more of the remaining hardware units.

The memory unit (130) may be configured to digitally store data consumed and produced by the processing unit (125). The memory unit (130) may include various types of memory modules, including volatile and nonvolatile memory. For example, the memory unit (130) of the present example includes Random Access Memory (RAM), Read Only Memory (ROM), and Hard Disk Drive (HDD) memory. Many other types of memory are available in the art, and the present specification contemplates the use of any type(s) of memory (130) in the memory unit (130) as may suit a particular application of the principles described herein. In certain examples, different types of memory in the memory unit (130) may be used for different data storage needs. For example, in certain examples the processing unit (125) may boot from ROM, maintain nonvolatile storage in the HDD memory, and execute program code stored in RAM.

The hardware adapters (135, 140) in the color palette model extraction device (105) are configured to enable the processing unit (125) to interface with various other hardware elements, external and internal to the color palette model extraction device (105). For example, peripheral device adapters (135) may provide an interface to input/output devices to create a user interface and/or access external sources of memory storage. Peripheral device adapters (135) may also create an interface between the processing unit (125) and a printer (145) or other media output device. For example, in examples where the color palette model extraction device (105) is configured to generate a document based on a color palette model extracted from the image of the document, the color palette model extraction device (105) may be further configured to instruct the printer (145) to create one or more physical copies of the color palette model information.

A network adapter (140) may provide an interface to the network (120), thereby enabling the transmission of data to and receipt of data from other devices on the network (120), including the server (115).

Figure 2A:
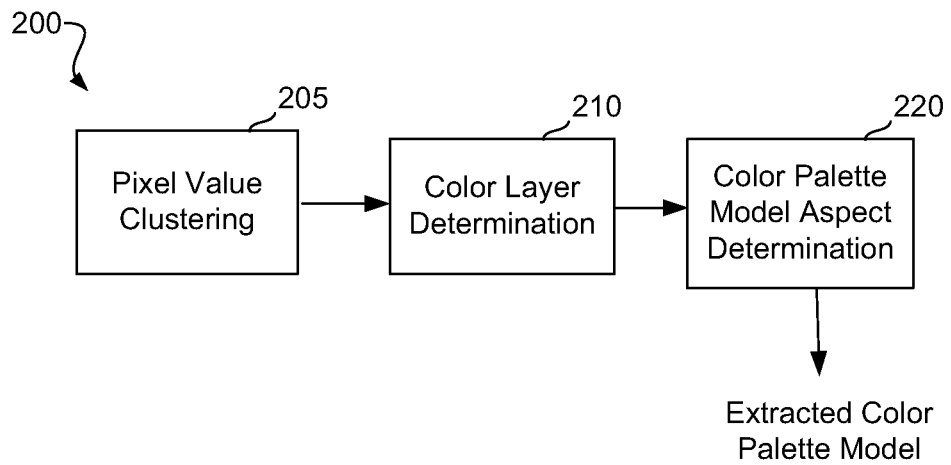
FIGS. 2A-2C are block diagrams of illustrative functionality implemented by an illustrative computerized a color palette model extraction device, according to examples of principles described herein.

Referring now to FIG. 2A, a block diagram is shown of an illustrative functionality (200) implemented by a color palette model extraction device (105, FIG. 1) for extraction of a color palette model from an image of a document consistent with the principles described herein. Each module in the diagram represents an element of functionality performed by the processing unit (125) of the color palette model extraction device (105, FIG. 1). Arrows between the modules represent the communication and interoperability among the modules.

The operations in block 205 of FIG. 2A are performed on an image of a document. The image can be obtained using an image receiving module. For example, the image receiving module may perform the functions of fetching the image from a server. A URL for obtaining the image may be specified by a user of the color palette model extraction device (105, FIG. 1) or, alternatively, be determined automatically. An image receiving module may then request the image of the document from a server over a network such as the internet using the URL.

In block 205 of FIG. 2A, the image of the document received in response to the request is made available to a pixel value clustering module. The pixel value clustering module clusters pixel values of the image of the document to provide image clusters. The pixel value clustering module performs a clustering analysis on pixel values that represent (or quantify) the color of the pixels of the image. There are many different scales that can be used to represent pixels. For example, for a grayscale image, an 8-bit value in which 0 represents black and 255 represents white can be used. For a color image having 3 channels (one for each of Red, Green and Blue (RGB)), the pixels in each channel can be represented by 8-bit values that represent the intensity of each of the component colors. In another example, a floating point representation between 0.0 and 1.0 can be used to represent pixel values between black and white. In another example, a different number of bits per color channel can be used to represent pixel values, each channel having corresponding different highest and lowest pixel values. In another example, pixel values are represented using CIELab, a mathematical derivative of a mathematical model produced by the Commission Internationale de l'Eclairage (CIE) that describes colors using three synthetic primaries: L (indicative of Lightness), a (indicative of red-greenness), and b (indicative of yellow-blueness). Other pixel quantification tools in the art can be applicable to provide the pixel values.

The pixel value clustering module performs a clustering analysis involving an assignment of the pixel values into subsets (clusters) so that elements in the same image cluster have a predetermined similarity. Non-limiting examples of distance metric that can be used to determine the similarity of two elements in the clustering analysis include the Euclidean distance (also called the 2-norm distance), the squared Euclidean distance, the Manhattan distance (also called the 1-norm distance), and the maximum norm (also called the infinity norm). Non-limiting examples of applicable clustering analysis include a hierarchical clustering analysis, such as an agglomerative hierarchical clustering, or a partitional clustering analysis, such as k-means clustering, fuzzy c-means clustering, or quality threshold (QT) clustering. In an example, the pixel value clustering module applies an unsupervised machine learning tool for clustering the pixel values.

A result of the clustering of block 205 is image clusters. Each image cluster can include a center pixel value (a color value) that represents the cluster. The set of center color values of each cluster can be determined as the palette colors of the color palette model.

In block 210 of FIG. 2A, a color layer determination module is used to determine color layers of the image. In an example, the color layer determination module performs its operations on image clusters obtained from the operations of block 205. A color layer can be determined as having the color of a central value of the image cluster. In an example, the central pixel value is a mean (also called a centroid), mode, or median of the pixel values in the image cluster. An example result of the operation of the color layer determination module is the separation of the image of the document into color layers. In an example, each color layer corresponds to a different color.

In an example, the color layer determination module performs its operations on quantized image clusters that each correspond to a respective image cluster obtained from the operations of block 205. A quantized image cluster is the corresponding image cluster with each pixel set to the same central value of the cluster (such as but not limited to the cluster mean, mode, or median). For example, a quantized image cluster can be obtained by assigning the central value to each pixel of the image cluster. In an example, each quantized image cluster corresponds to a different color. In this example, each color layer corresponds to the color of each quantized image cluster.

In block 220 of FIG. 2A, a color palette model aspect determination module is applied to the results from block 210 to extract an aspect of the color palette model (including a foreground-background color pair, or a background-area color). In an example, the color palette model aspect determination module can be applied to provide a foreground-background color pair of the color palette model (see block 220-1 of FIG. 2B). In another example, the color palette model aspect determination module can be applied to provide a background-area color of the color palette model (see in block 220-1 of FIG. 2C).

The color palette model aspect determination module can be used to extract aspects of a color palette model, including one or more of a set of color values, a set of pairs of colors for text foreground and text background of a text block, a set of pairs of colors for graphics foreground and graphics background for a graphics object (such as but not limited to a line), and a subset of colors that can be used for area-filling background.

Figure 2B:
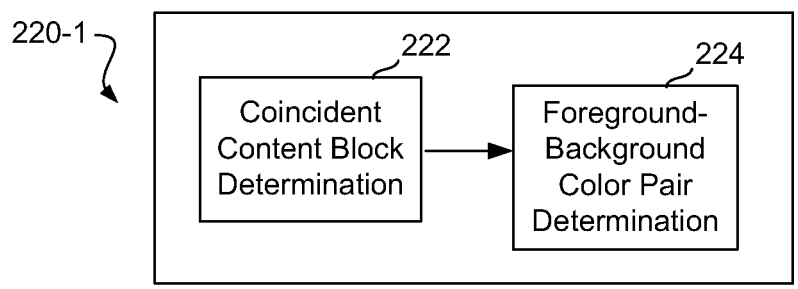
Figure 2C:
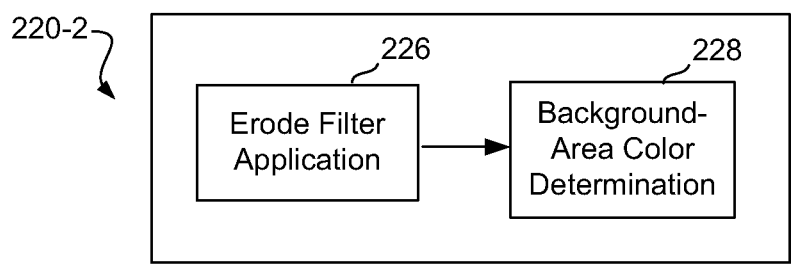

In an example, the color palette model aspect determination module 220 can be a single module that performs the operations illustrated in FIGS. 2B and 2C. In another example, the color palette model aspect determination module 220 is more than one module. For example, separate modules can perform each of the operations illustrated in FIGS. 2B and 2C.

In block 220-1 of FIG. 2B, color palette model aspect determination module 220 determines a foreground-background color pair of the color palette model. The operation of block 222 involves coincident content block determination. For a content block detected in a first color layer of the document, the coincident content block determination process involves determining a second color layer of the document for which a coincident content block is detected in the inverse color layer of that second layer. In the operation of block 224, the color of the first color layer and the color of the second color layer are determined as a foreground-background color pair in the color palette model of the document.

In block 220-2 of FIG. 2C, color palette model aspect determination module 220 determines a background-area color of the color palette model. The operation of block 226 involves erode filter application. An erode filter is applied to a color layer of the document a predetermined number of times to provide an eroded color layer. The predetermined number of times can be a preset number, or can be adaptively determined using an adaptive algorithm. In the operation of block 228, if the number of pixels of the eroded color layer is above a predetermined threshold value, the color of that color layer is determined as a background-area color in the color palette model of the document. The predetermined threshold value can be set by a user or adaptively determined.

The operations of FIGS. 2A-2C can be applied to a single image of a single page of a document. In another example, the operations of FIGS. 2A-2C can be applied to multiple images, each being an image of a different page of a document. The system can process multiple images, one for each page of the original document. In one example, all of the images can be concatenated together as one large composite image, and a single color palette model can be extracted from the composite image. In another example, a separate color palette model can be extracted for each image page, and then the color palette models can be combined by, for example, creating a union of the individual extracted color palette models. In an example involving multiple images, some of the operations can be performed in a parallel execution.

The process of color palette model extraction may be performed automatically in response to an automatic or user-generated trigger. Thus, in certain examples a user may instruct a computer to extract a color palette model from an image of a document by pressing a button or a link. The computer may perform the color palette model extraction as described above, then automatically generate information describing the color palette model.

In other examples, the color palette model extraction device (105, FIG. 1) or another device may be configured to use the extracted color palette model from an image of a document according to the above methods. For example, the color palette model extraction device (105, FIG. 1) may be coupled to other modules that can be used to generate a second document using the extracted color palette model.

Figure 3:
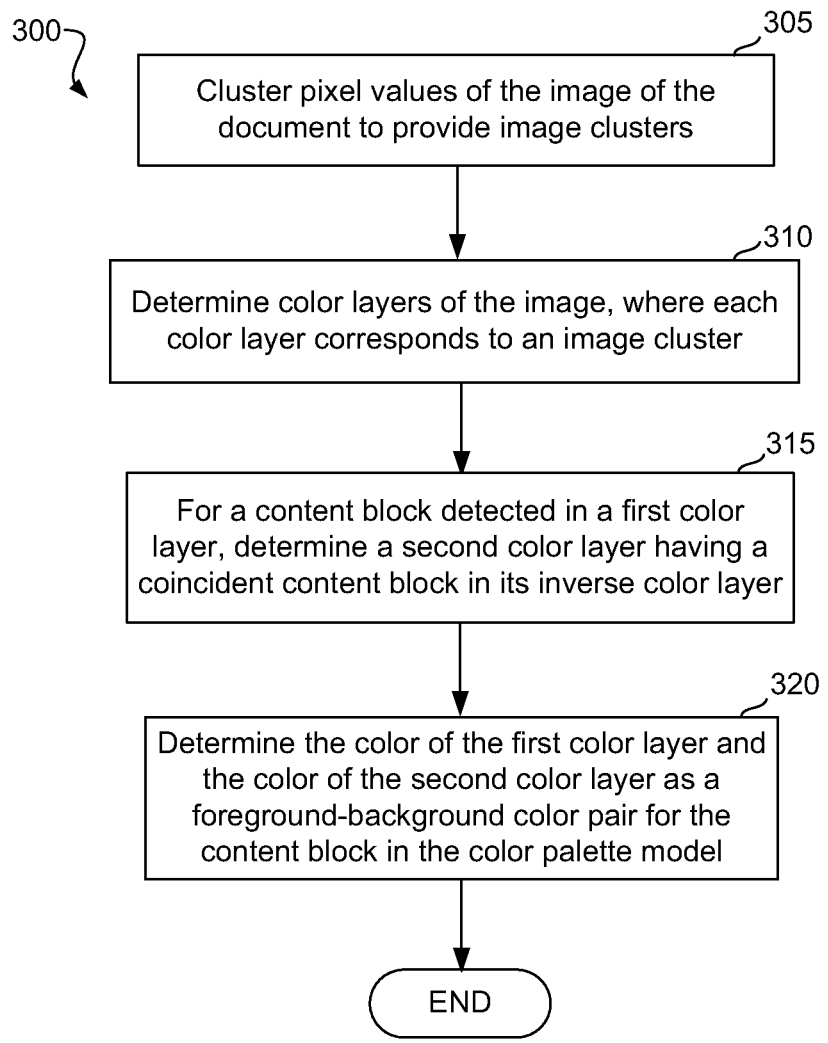
FIG. 3 is a flowchart diagram of an illustrative method of extracting a color palette model from an image of a document, according to one example of principles described herein.

Referring to FIG. 3, a flowchart is shown of a method (300) summarizing an example procedure for extracting a color palette model from an image of a document. This method (300) may be performed by, for example, the processing unit (125, FIG. 1) of a computerized color palette model extraction device (105, FIG. 1). The method (300) includes clustering (305) pixel values of the image of the document to provide image clusters. Color layers of the image are determined (310), where each color layer corresponds to a quantized image cluster, and where each quantized image cluster is an image cluster in which each pixel is assigned a central pixel value representative of the image cluster. For a content block detected in a first color layer of the document (315), a second color layer of the document is determined for which a coincident content block is detected in the inverse color layer of that second layer. The color of the first color layer and the color of the second color layer are determined (320) as a foreground-background color pair for the content block in a color palette model of the document.

Figure 4:
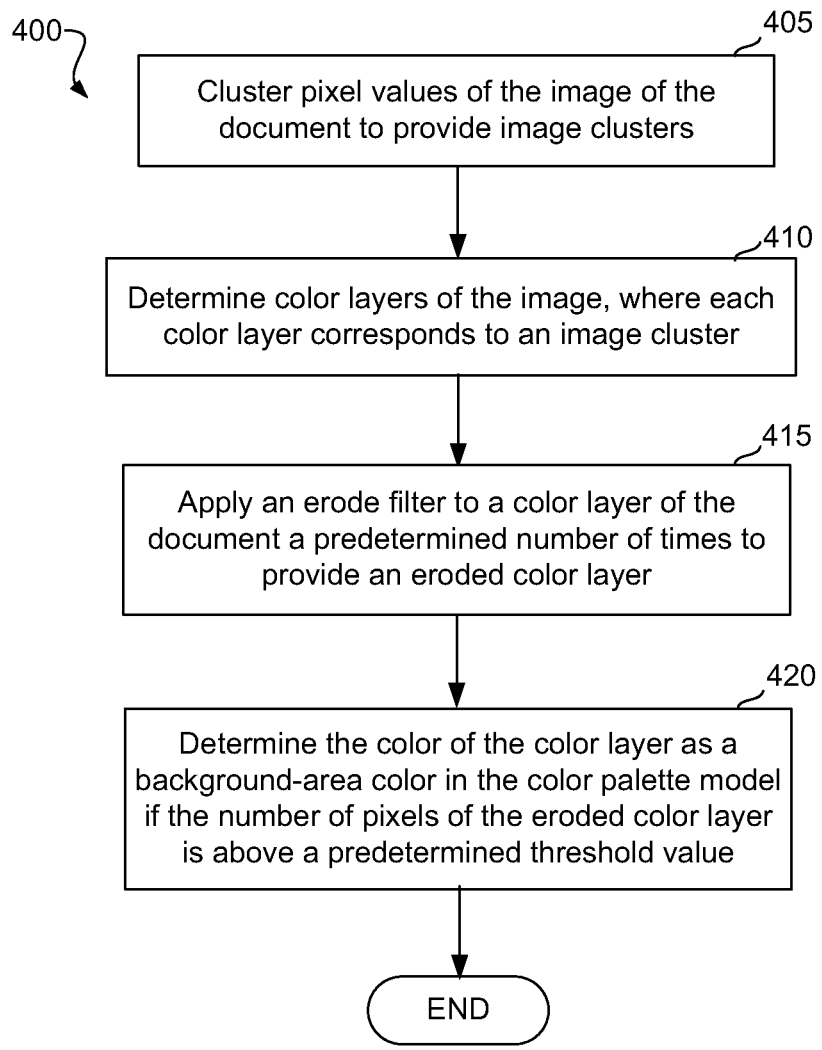
FIG. 4 is a flowchart diagram of an illustrative method of extracting a color palette model from an image of a document, according to one example of principles described herein.

Referring now to FIG. 4, a flowchart is shown of a method (400) summarizing another example procedure for extracting a color palette model from an image of a document. This method (400) may be performed by, for example, the processing unit (125, FIG. 1) of a computerized web content extraction device (105, FIG. 1). The method (400) includes clustering (405) pixel values of an image of a document to provide image clusters. Color layers of the document are determined (410), where each color layer corresponds to a quantized image cluster, and where each quantized image cluster is an image cluster in which each pixel is assigned a central pixel value representative of the image cluster. An erode filter is applied (415) to a color layer of the document a predetermined number of times to provide an eroded color layer. If the number of pixels of the corresponding eroded color layer is above a predetermined threshold value (420), the color of the given color layer is determined as a background-area color in a color palette model of the document. The erode filter can be an erode morphological filter. The erode filter can be applied multiple times to each color layer. The remaining pixels of a color after application of the erode filter are quantified and compared to the predetermined threshold value.

In an example system and method, the number of clusters to be derived from the clustering is not known a priori, so the clustering is also used to determine the natural number of clusters. An example of an applicable clustering is one that runs k-means or k-medoids repeatedly for different values of k, where k is an integer value, and selects the clustering with the highest silhouette coefficient. In an image, there can be pixels with the same color values. In an example system and method, the clustering can be configured to group all the pixels with the same color value into a single weighted data point. As a result, the performance of the clustering may not depend on the number of pixels, but rather on the number of different pixels.

In an example system and method, prior to application of the pixel value clustering module, the image can be rescaled to a smaller size. The scaling may be performed by not interpolating pixel values, which can cause the color values of the pixels to be "smeared." In another example system and method, the color space of pixel values of the image can be converted from a RGB into a CIELab color space (a more perceptually uniform color space) prior to performance of the clustering.

In an example system and method, the pixel color values of an image cluster are quantized prior to clustering. If the document has embedded photographs or other areas of continuously varying tone, quantizing prior to clustering can result in these features combining into a smaller number of data points, which can facilitate clustering using less computational resources.

In an example system and method, during color layer determination, the image clusters derived from the clustering can be quantized to provide quantized image clusters. The image pixel value of each pixel of an image cluster can be set to a central pixel value of that image cluster to provide the quantized image cluster. The quantized image clusters can be considered a breaking of the image into color layers, one per color. For an image stored as a bitmap, each color layer can have a pixel depth of one bit. An Inverse color layer of each color layer can be generated by flipping the bits for that color layer.

In an example system and method, the foreground-background color pair can be determined for a text block. The block of text can be identified by segmenting the document image to identify rectangular text areas using text detection. The text detection can be applied separately to each color layer and to the inverse of each color layer. For each text block found in a color layer, a roughly coincident text block is determined in the inverse color layers of another of the colors. For each such coincident pair of text blocks detected, the two colors can be determined as the corresponding pair of colors to be a text background-text foreground color pair for the text block.

In an example system and method, the foreground-background color pair can be determined for graphic lines. Line detection can be applied separately to each color layer and to the inverse of each color layer. A non-limiting example of line detection can be to identify peaks in the Hough transform of each color layer. If coincident peaks are identified in the Hough transform of an inverse color layer of a different color, the two colors can be determined as the corresponding pair of colors to be a graphics background-graphics foreground color pair for the graphic lines.

In an example system and method, a less computationally intensive line detector is used in place of the Hough transform. An example is a method that uses a simpler method that detects horizontal and vertical lines, by for example, projecting the pixels onto the x- and y-axes and looking for sharp transitions (such as spikes) of each color in the one-dimensional profiles.

In an example system and method, portions of the computation can be performed in parallel for efficient execution on a cluster of machines and/or multi-core computers. For example, if the clustering performed applies multiple k-medoids or k-means for different values of k, these could all be performed in parallel. In another example, the different text blocks detections and graphics object detections (such as line detection) on all the color layers and inverse color layers can all be performed in parallel.

FIGS. 5-8B provide illustrations of an example implementation of various aspects of the process of extracting a color palette model from an image of a document as outlined above.

Figure 5:
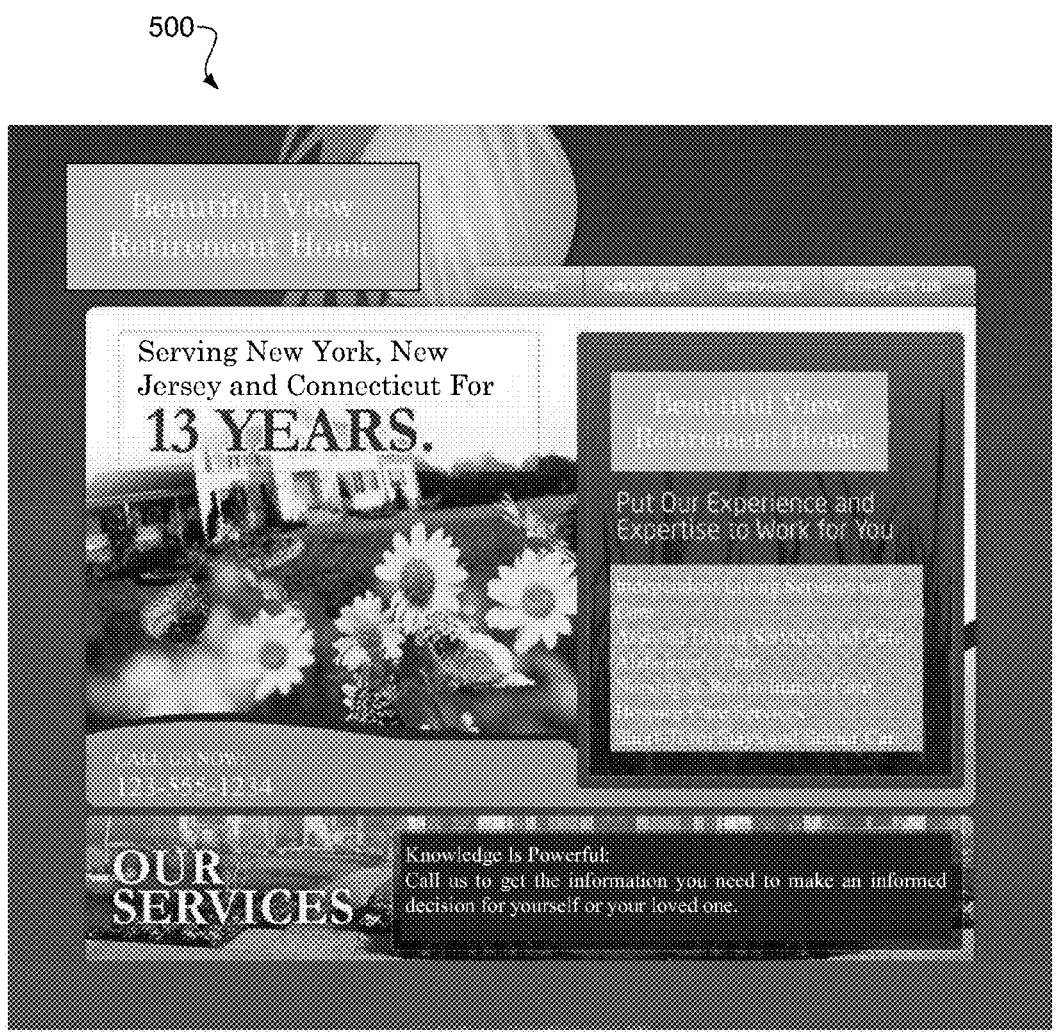
FIG. 5 shows an illustrative example image of a web page from which a color palette model can be extracted, according to one example of principles described herein.

FIG. 5 is non-limiting example of an image (500) of a document (in this example, a web page) to which the color palette model extraction device (105, FIG. 1) is applied. The image is stored as a bitmap.

Figure 6:
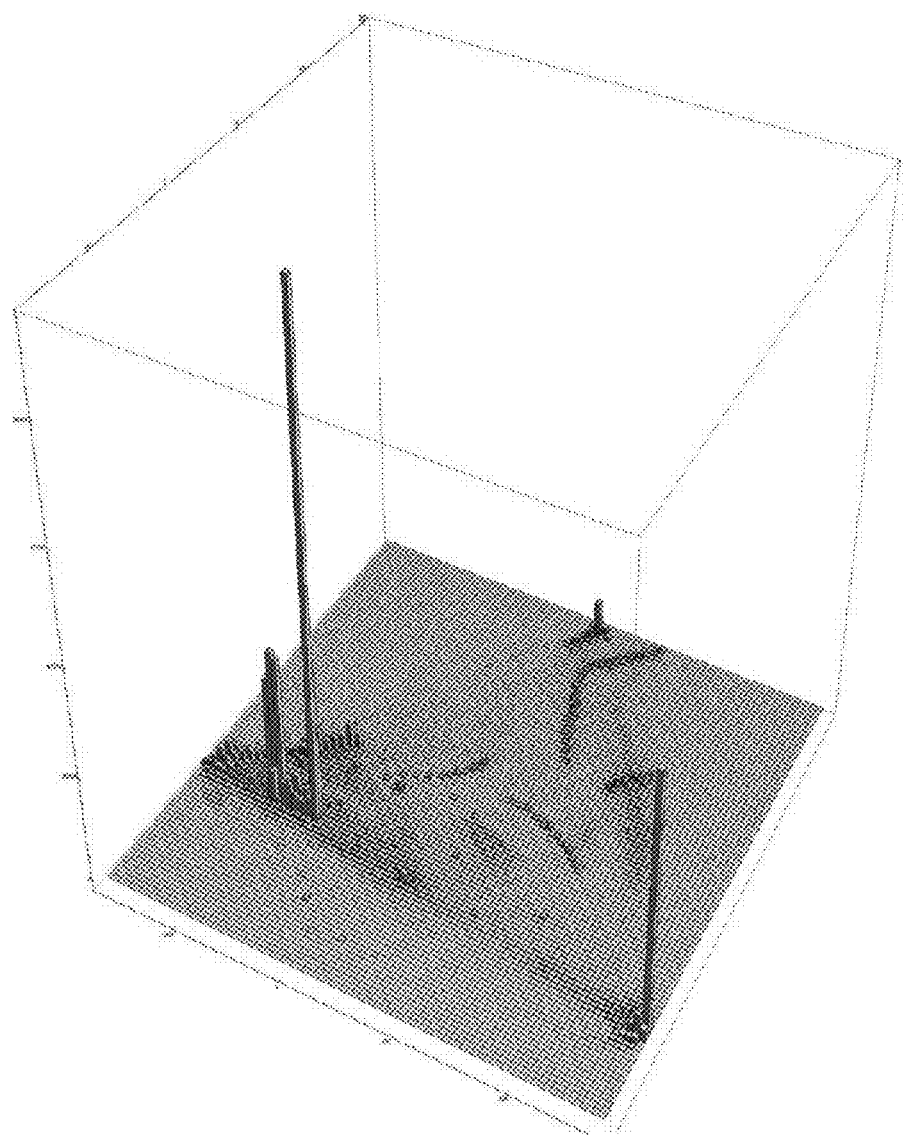
FIG. 6 shows a histogram of the distribution of pixel color values in a two-dimensional color space derived from the image of FIG. 5, according to one example of principles described herein.

FIG. 6 shows a histogram of the distribution of pixel color values in a two-dimensional color space derived from the image of FIG. 5. The x- and y-axes (plane of the plot) represent the color space, and the vertical axis (z-axis) represents pixel values. The histogram is a plot of pixel values (pixel counts) in a 2-D color space of the image (which is a projection of RGB space), obtained using principal components dimensionality reduction. The histogram of FIG. 6 shows that there are at least three possible image clusters of pixel values, possibly more if the cluster on the left-hand side of the plot is sub-divided.

Figure 7B:
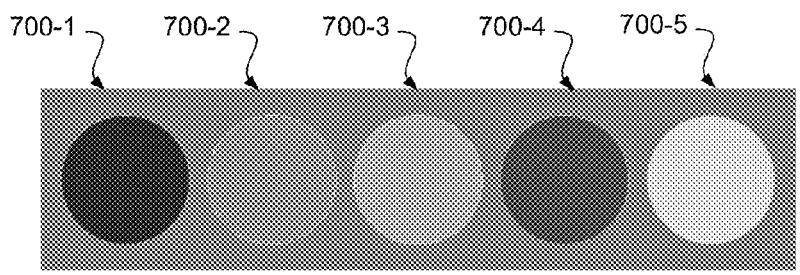
FIG. 7B illustrates the image of FIG. 5 rendered using the determined color layers, according to one example of principles described herein.
Figure 7A:
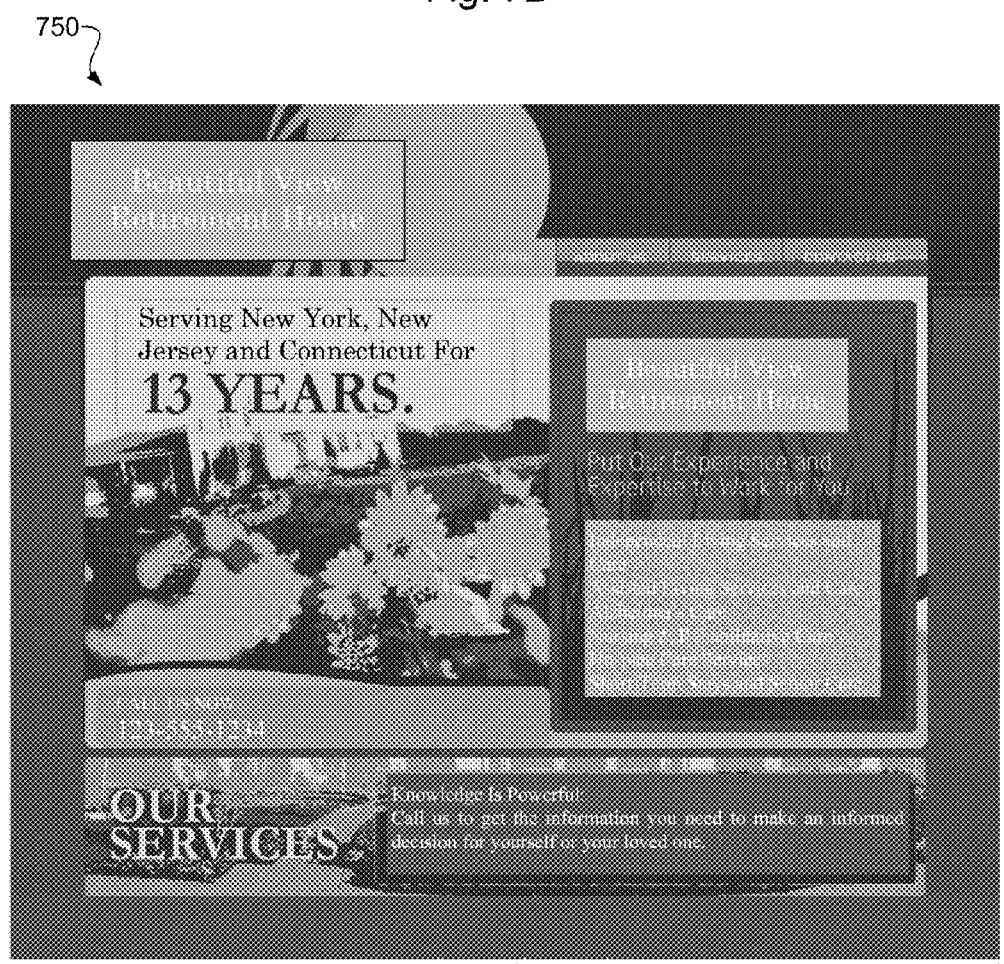
FIG. 7A shows the color layers determined based on the image clusters resulting from the clustering, according to one example of principles described herein.

FIG. 7A shows five color layers ($700\text{-}i$, $i=1, \ldots, 5$) determined based on the image clusters resulting from a clustering analysis of the pixels of the image. Each color layer corresponds to an image cluster resulting from the clustering. In the example of FIG. 7A, the determined color layers have the color of the centroid (mean) of the respective image cluster. These five color layers form the color palette of the color palette model. The determined color layers provide a reasonable representation of a color palette for the web page.

FIG. 7B illustrates the image of FIG. 5 rendered (750) using solely the determined color layers. The example image of FIG. 5 is quantized to the color layers of the determined color palette to provide FIG. 7B. FIG. 7B is a visualization of the application of the color layers to the example web page.

Using the determined colors of the color palette, the image can be broken down into its color layers, one per color, each with a pixel depth of one bit. FIG. 8A illustrates the image of FIG. 5 rendered (800) using one of the determined color layers. FIG. 8B illustrates the image of FIG. 5 rendered (850) using the inverse of another of the determined color layers.

Using the determined color layers, the image is segmented to find rectangular text areas using text detection. The text detection runs separately on each color layer and on the inverse of each color layer. For each text block found in a color layer, the text detection identifies a roughly coincident text block found in the inverse layers of the other colors. For each such pair of text blocks detected, the corresponding pair of colors are determined to be "text background" and "text foreground" of the color palette model.

As an example of graphics object determination, thin lines in the bitmap are identified and foreground/background color pairs used to draw the lines are determined. Line detection analysis is performed separately on each color layer and each inverse color layer. In this example, the line detection analysis look for peaks in the Hough transform of each color layer, and coinciding peaks in the transform of an inverse layer of each different color layer. The pair of colors are determined to be "graphics foreground" and "graphics background" of the color palette model for the line graphic.

In the example, to identify area-filling background colors, an erode morphological filter is applied multiple times to each color layer and the remaining pixels of that color are counted. A color layer that has a remaining pixel count above a predetermined threshold value is determined as an area-filling background color.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method performed by a physical computing system comprising at least one processor for determining a color palette model from an image of a document, said method comprising:

clustering pixel values of the image of the document to provide image clusters;

determining color layers of the image, wherein each color layer corresponds to an image cluster;

for a content block detected in a first color layer of the image of the document, determining a second color layer of the image of the document for which a coincident content block is detected in the inverse color layer of that second color layer; and determining the color of the first color layer and the color of the second color layer as a foreground-background color pair for the content block in a color palette model of the image of the document, wherein the clustering, determining color layers, determining a second color layer, and determining the foreground-background color pair are performed using the computing system.

2. The method of claim 1, wherein each color layer has the color of a mean, a mode, or a median of the pixel values in the image cluster.

3. The method of claim 1, wherein the content block is a text block, and wherein the method further comprises applying text detection to a color layer of the image of the document to detect the text block in the first color layer, and applying the text detection to the inverse color layer corresponding to other color layers of the document to determine the second color layer having the coincident text block in the inverse color layer of that second color layer.

4. The method of claim 1, wherein the content block is a graphics object, and wherein the method further comprises applying line detection to a color layer of the image of the document to detect the graphics object in the first color layer, and applying line detection to the inverse color layer corresponding to other color layers of the document to determine the second color layer having the coincident graphics object in the inverse color layer of that second color layer.

5. The method of claim 4, wherein the line detection is a Hough transform, and wherein detecting the graphics block comprises detecting peaks in the Hough transform of the first color layer, and detecting the coincident graphics object comprises detecting coinciding peaks in the Hough transform of the inverse color layer of another of the color layers of the document.

6. The method of claim 1, further comprising, prior to the clustering, rescaling the image of the document to a smaller size without interpolating pixel values.

7. A method performed by a computing system comprising at least one processor for determining a color palette model from an image of a document, said method comprising:

clustering pixel values of an image of a document to provide image clusters;

determining color layers of the image, wherein each color layer corresponds to an image cluster;

applying an erode filter to a given color layer of the image of the document a predetermined number of times to provide a corresponding eroded color layer; and determining the color of the given color layer as a background-area color in a color palette model of the image of the document if the number of pixels of the corresponding eroded color layer is above a predetermined threshold value, wherein the clustering, determining color layers, applying the erode filter, and determining the background-area color are performed using the computing system.

8. The method of claim 7, wherein each color layer has the color of a mean, a mode, or a median of the pixel values in the image cluster.

9. The method of claim 7, further comprising, prior to the clustering, rescaling the image of the document to a smaller size without interpolating pixel values.

10. Apparatus for processing image data, comprising:

a memory storing computer-readable instructions; and a processor coupled to the memory, to execute the instructions, and based at least in part on the execution of the instructions, to perform operations comprising:

clustering pixel values of the image of a document to provide image clusters;

determining color layers of the image, wherein each color layer corresponds to an image cluster;

for a content block detected in a first color layer of the image of the document, determining a second color layer of the image of the document for which a coincident content block is detected in the inverse color layer of that second color layer; and determining the color of the first color layer and the color of the second color layer as a foreground-background color pair for the content block in a color palette model of the image of the document.

11. The apparatus of claim 10, wherein the content block is a text block, and wherein the method further comprises applying text detection to a color layer of the image of the document to detect the text block in the first color layer, and applying the text detection to the inverse color layer corresponding to other color layers of the image of the document to determine the second color layer having the coincident text block in the inverse color layer of that second color layer.

12. The apparatus of claim 10, wherein the content block is a graphics object, and wherein the method further comprises applying line detection to a color layer of the image of the document to detect the graphics object in the first color layer, and applying line detection to the inverse color layer corresponding to other color layers of the image of the document to determine the second color layer having the coincident graphics object in the inverse color layer of that second color layer.

13. The apparatus of claim 12, wherein the line detection is a Hough transform, and wherein detecting the graphics block comprises detecting peaks in the Hough transform of the first color layer, and detecting the coincident graphics object comprises detecting coinciding peaks in the Hough transform of the inverse color layer of another of the color layers of the image of the document.

14. Apparatus for processing image data, comprising:

a memory storing computer-readable instructions; and a processor coupled to the memory, to execute the instructions, and based at least in part on the execution of the instructions, to perform operations comprising:

clustering pixel values of an image of a document to provide image clusters;

determining color layers of the image, wherein each color layer corresponds to an image cluster;

applying an erode filter to a given color layer of to image of the document a predetermined number of times to provide a corresponding eroded color layer; and determining the color of the given color layer as a background-area color in a color palette model of the image of the document if the number of pixels of the corresponding eroded color layer is above a predetermined threshold value.

15. At least one computer-readable medium storing computer-readable program code adapted to be executed by a computer to implement a method comprising:

a memory storing computer-readable instructions; and a processor coupled to the memory, to execute the instructions, and based at least in part on the execution of the instructions, to perform operations comprising:

clustering pixel values of the image of a document to provide image clusters;

determining color layers of the image, wherein each color layer corresponds to an image cluster;

for a content block detected in a first color layer of the image of the document, determining a second color layer of the image of the document for which a coincident content block is detected in the inverse color layer of that second color layer; and determining the color of the first color layer and the color of the second color layer as a foreground-background color pair for the content block in a color palette model of the image of the document.

16. The computer-readable medium of claim 15, wherein the content block is a text block, and wherein the method further comprises applying text detection to a color layer of the image of the document to detect the text block in the first color layer, and applying the text detection to the inverse color layer corresponding to other color layers of the image of the document to determine the second color layer having the coincident text block in the inverse color layer of that second color layer.

17. The computer-readable medium of claim 15, wherein the content block is a graphics object, and wherein the method further comprises applying line detection to a color layer of the image of the document to detect the graphics object in the first color layer, and applying line detection to the inverse color layer corresponding to other color layers of the image of the document to determine the second color layer having the coincident graphics object in the inverse color layer of that second color layer.

18. The computer-readable medium of claim 17, wherein the line detection is a Hough transform, and wherein detecting the graphics block comprises detecting peaks in the Hough transform of the first color layer, and detecting the coincident graphics object comprises detecting coinciding peaks in the Hough transform of the inverse color layer of another of the color layers of the image of the document.

19. At least one computer-readable medium storing computer-readable program code adapted to be executed by a computer to implement a method comprising:

a memory storing computer-readable instructions; and a processor coupled to the memory, to execute the instructions, and based at least in part on the execution of the instructions, to perform operations comprising:

clustering pixel values of an image of a document to provide image clusters;

determining color layers of the image, wherein each color layer corresponds to an image cluster;

applying an erode filter to a given color layer of the image of the document a predetermined number of times to provide a corresponding eroded color layer; and determining the color of the given color layer as a background-area color in a color palette model of the image of the document if the number of pixels of the corresponding eroded color layer is above a predetermined threshold value.

\* \* \* \* \*

UNITED STATES PATENT AND TRADEMARK OFFICE
CERTIFICATE OF CORRECTION

PATENT NO. : 8,593,478 B2  
APPLICATION NO. : 12/907936  
DATED : November 26, 2013  
INVENTOR(S) : Eamonn O'Brien-Strain et al.

It is certified that error appears in the above-identified patent and that said Letters Patent is hereby corrected as shown below:

In the Claims

In column 12, line 56, in Claim 14, delete "to image" and insert -- the image --, therefor.

Signed and Sealed this  
Fourth Day of March, 2014

Michelle K. Lee  
*Deputy Director of the United States Patent and Trademark Office*